March 23, 1937. E. F. CHITTENDEN Re. 20,301

WINDOW VENTILATOR

Original Filed Feb. 12, 1934 2 Sheets-Sheet 1

Inventor
Edwin F. Chittenden

By Owen & Owen
Attorneys

March 23, 1937. E. F. CHITTENDEN Re. 20,301

WINDOW VENTILATOR

Original Filed Feb. 12, 1934 2 Sheets-Sheet 2

Inventor
Edwin F. Chittenden

By Owen & Owen
Attorneys

Reissued Mar. 23, 1937

Re. 20,301

UNITED STATES PATENT OFFICE 20,301

WINDOW VENTILATOR

Edwin F. Chittenden, Ottawa Hills, Ohio

Original No. 2,036,851, dated April 7, 1936, Serial No. 710,877, February 12, 1934. Application for reissue September 14, 1936, Serial No. 100,702

10 Claims. (Cl. 98—94)

This invention relates to ventilators, but more particularly to a power driven ventilator adapted to be disposed between the sill and lower sash of a window for forcing air into a room and diffusing the same therein.

An object of the invention is to provide a method of ventilating a room in which air is drawn in from the outside, filtered, and then forced into the room at a relatively high velocity so that not only is cleansed or filtered air introduced into the room, but the air within the room is agitated and diffused.

More particularly, it is an object of the invention to provide a method and apparatus whereby air may be drawn through a filter of the type of packed steel wool, glass wool, or other mineral wool, in such a way as to filter out pollen and like material, as well as the coarser dust, and force the filtered air into the room upwardly so that it moves to the ceiling of the room being ventilated, and there spreads out before settling, so that drafts are avoided.

Details and further objects of the invention will appear as the description proceeds.

For purposes of illustration, but not of limitation, apparatus in accordance with one embodiment of the invention is shown on the accompanying drawings, in which.

Figure 1:
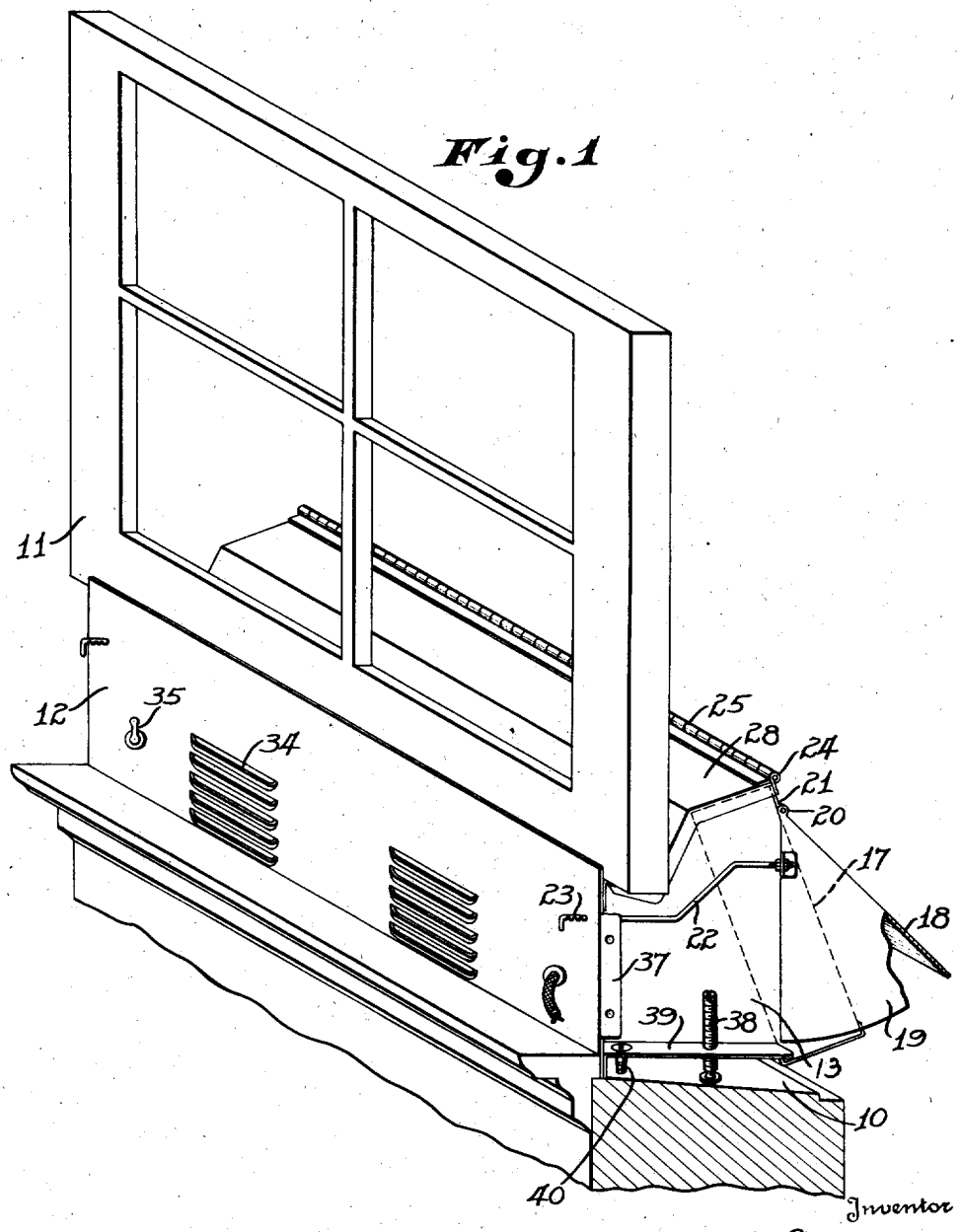
Figure 1 is a perspective view of ventilator installed between the sill and window sash.
Figure 2:
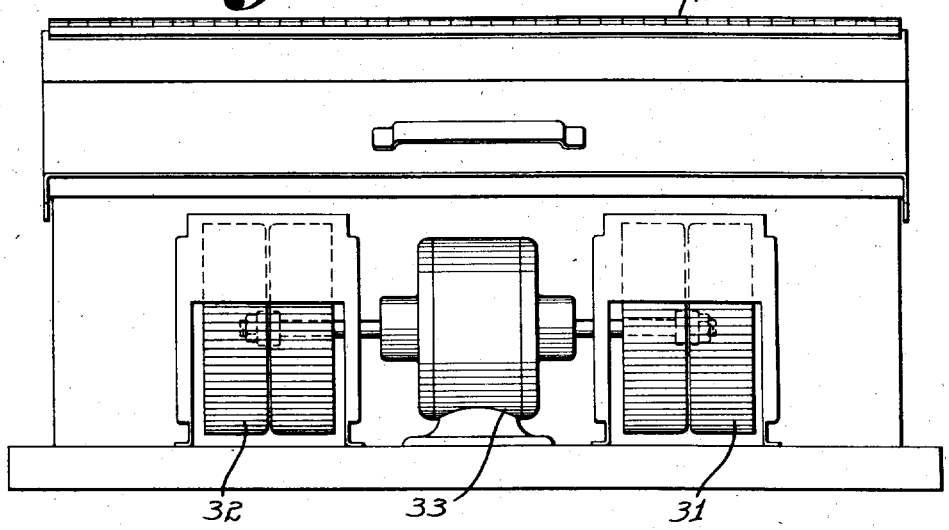
Figure 2 is a front elevation of the ventilator with the front wall or panel removed.
Figure 3:
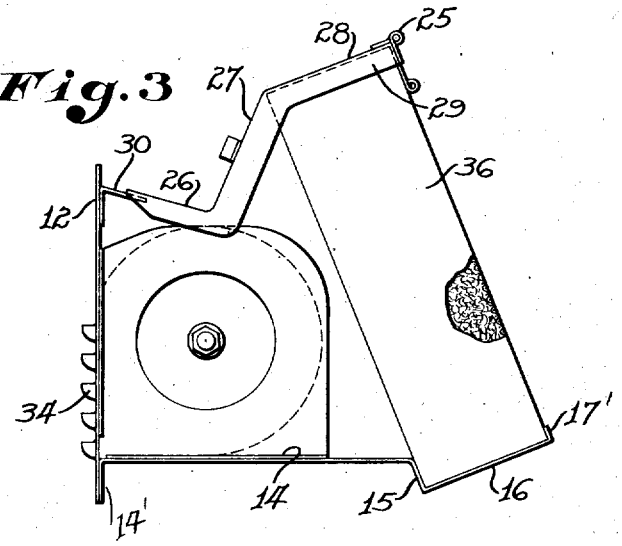
Figure 3 is an end elevation of the ventilator with a side wall removed.

The illustrated apparatus comprises a window ventilator which is adapted to be installed between the sill 10 of a window opening and the lower window sash 11 thereof, it being merely necessary to raise the sash, insert the ventilator, properly secure the ventilator in place, and lower the sash against the upper portion of the ventilator, as will hereinafter appear. The ventilator comprises a housing having a front wall or panel 12, side walls 13, and a bottom wall 14. The front panel 12 is disposed in upright position or in a plane parallel to the plane of the sash 11. The bottom wall 14 is spaced upwardly a slight distance from the lower edge of the panel 12 to position the bottom wall in the position shown in Figure 1. The forward portion of the bottom wall 14 extends downwardly, as indicated at 14′, while the rear portion inclines downward at 15, and then inclines upwardly providing an inclined portion 16 which terminates in an upturned flange 17′. The rear of the housing is open to provide an inlet 17, which is controlled by a shield 18 having side wings 19 to prevent rain from entering the ventilator. The shield 18 is co-extensive with the housing and the wings 19 are adapted to lap over the side walls 13. The upper edge of the shield is connected by a hinge 20 to a transverse strip 21 secured to the upper end of the side walls. Rods 22 connected to each of the wings 19 extend forwardly therefrom through openings provided in the front panel 12, and have a series of notches 23 to enable the shield to be secured in adjusted position. This enables the shield to be adjusted from the inside of the room, and adjustment may be made in accordance with the weather conditions. If desired, the shield can be entirely closed providing an effective seal for the outer end of the ventilator.

Closing the top of the housing is a cover 24 which is connected to the strip 21 by a hinge 25. The front edge portion of the cover 24 is disposed below the top edge of the front panel 12 and inclines therefrom downwardly and rearwardly, as shown at 26, and thence inclines upwardly and rearwardly, as indicated at 27. The extreme upper wall portion 28 extends at an angle to the portion 27 inclining upwardly and rearwardly to the hinge 25. Flanges 29 depend from the opposite edge portions of the cover 24 to overlap the side walls 13 respectively. The arrangement is such that when the sash 11 is raised, the cover 24 may be swung upwardly to reveal the inside of the housing. It will be seen that the construction is such that a comparatively small area is taken up by the ventilator, which would otherwise be effective in shutting of light to the interior of the room, and the raised rear portion enables a filter unit of sizable proportions to be used, as will hereinafter appear. It should be noted that the lower edge of the sash 11 is adapted to rest against a downwardly inclined strip 30 secured to the rear face of the panel 12, and this strip also provides an abutment against which the free edge of the cover 24 rests.

As above mentioned, the rear portion of the bottom wall 14 of the housing is cupped at 16, and the cupped portion is disposed at an angle to the plane of the bottom wall with a portion thereof disposed therebeneath. This portion is substantially parallel to the wall 28 of the cover 24. Arranged with the lower edge disposed in the cup portion 16 and the upper portion adjacent the cover wall 28 and the sides terminating adjacent the side walls of the housing, is a removable filter unit 36, preferably of spun glass wool because of its extremely high efficiency for filtering air, and, further, in view of its comparatively low cost. A filter unit of this character may be readily inserted by swinging the cover 24 upright and sliding the unit into position. In view of the inherent construction of the filter and its arrangement, very little resistance is afforded to the passage of air into the ventilator, and, because of the large area of the inlet, a substantial volume of air may be readily drawn in through the inlet opening 17 with comparatively little effort. The upwardly inclined portion 27 of the cover forms with the upper wall portion 28 a socket into which the upper portion of the filter unit 36 extends for assisting in retaining the unit in the desired inclined position.

Directly in advance of the filter unit and arranged closely thereto are fans 31 and 32 conjointly driven by an electric motor 33. The fans are preferably of a squirrel cage type, in which the air is drawn in axially and discharged radially. The fans are likewise arranged close to the front panel 12, which is provided with a series of louvers 34 which direct the air upwardly. Preferably, the discharge openings provided by the louvers 34 should be of considerably less area than the area of the inlet opening 17, and, conveniently, the area of the inlet opening 17 may be at least ten times the combined area of the discharge openings.

A switch 35 on the front panel 12 enables convenient control of the motor 33. Projecting from opposite sides of the panel 12 are wings 37 to which other panels may be attached to accommodate the full width of the window opening. The lower edge of the panel 12 rests on the sill 10, but it is necessary that the outer end of the housing be raised from the sill, and to accomplish this purpose an adjustable screw 38 extends through a flange 39, which projects laterally from each of the side walls 13, and engages the sill 10. By turning the screw 38 the housing may be raised or lowered to the desired position. Screws 40 extending through the flanges 39 secure the housing to the sill to hold the assembly rigidly in place.

It is to be observed that a glass wool filter unit 36, as referred to herein, is presently being sold on the open market, and consists of a fibrous mass in which the fibers are either of blown or spun glass coated with an oily substance. The filter is enclosed in a housing of inexpensive sheet material such as paste-board, so that after a unit is full of dirt and has served its usefulness, it can be thrown away and replaced by a new one. This can be conveniently done since the cost of them is nominal.

Authorities have recommended drawing air through mineral wool filters, and other packed filters of the impingement type, at a velocity of at least 300 feet per minute, their theory being that such high velocities cause foreign particles to follow comparatively straight paths so that they impinge upon and cling to the filter members instead of following the tortuous paths of the air through the filter. I have discovered that a much lower velocity is much more efficient in removing very fine particles, such as pollen, by a filter of glass wool, or equivalent material. At the lower velocity the particles settle and remain upon the filter members, whereas the higher velocities tend to blow them off of such members as they may impinge upon.

For these reasons I prefer to draw the air through the filter at a velocity not exceeding 100 feet per minute, and preferably around 50 feet per minute.

Normally, there is a layer of warmer air at the ceiling. A stream of air projected upward at low velocity rises for a time and then curves outward and downward in a path similar to that of a thrown ball, and creates a definite objectionable draft as it returns toward the floor, and leaves undisturbed the blanket of warm air beneath the ceiling.

It will be noted that louvers 34 discharge the air in substantially parallel contiguous sheets. This has an effect on the air stream something like the lens of a searchlight upon a beam of light, in that it aids in projecting a definite end stream and increasing the distance to which it is projected. It is preferable to project the stream with sufficient velocity so that it reaches and spreads out against the ceiling. It then descends gently and evenly without setting up an objectionable draft.

It also mixes with the warm air next to the ceiling, gently agitates substantially the entire atmosphere of the room, and renders the temperature more even.

To reach the ceiling from the bottom of a window in the usual dwelling with surety under varying temperature conditions, the upward jet should have a velocity of at least 600 feet per minute. To allow for occasionally high ceilings and adverse conditions, I prefer to provide a general purpose unit imparting an initial velocity of about 750 feet per minute to the discharged air. Occasionally high ceilings may require higher velocities, but such conditions are exceptional, and such higher velocities, usually unnecessary, increase the cost of the fan, the energy required, and the difficulties from noise, etc.

As pointed out above, the total area of louvers 34 is approximately one-tenth that of the cross-section of the filter normal to the path of air travel; but the upward slant of the discharged air reduces the cross-sectional area normal to its direction of movement, so that the actual discharge velocity is about 750 feet per minute with an intake velocity through the filter of about 50 feet per minute.

As the filter becomes somewhat clogged with material, the effective air inlet area is reduced, so that for long and effective use of a filter it should have sufficient cross-sectional area to provide an initial inlet velocity materially lower than the highest permissible. A well made glass wool filter retains high filtering efficiency for upwards of a year constant use in normal atmosphere with an intake velocity of 50 or 60 feet per minute. With this low velocity of intake, such a filter accords a very substantially greater degree of relief to hay fever patients than does a like filter through which air is drawn at a velocity of 300 feet per minute, as is customarily advised with this type of filter.

In the appended claims, the expression "mineral wool type filter" refers to a filter having filtering characteristics like those of glass, steel, and other mineral wool packs suitably treated for filtering purposes, as is customary, while "pollen-settling velocity" refers to a velocity at which the pollen particles may settle and remain upon the filter members, instead of relying upon the momentum of the pollen particle to carry it into contact with the filter member, as is customary in impingement type filters.

It is to be understood that numerous changes in details of construction, arrangement and operation may be effected without departing from the spirit of the invention as defined in the appended claims.

This application constitutes a continuation in part of application Serial No. 675,368, filed June 12th, 1933.

What I claim as new and desire to secure by Letters Patent is:

1. In ventilating a room, the method which consists in drawing air through an inlet opening, passing the air through a filter at a velocity not exceeding 100 feet per minute, and discharging the filtered air at an upward angle into the room at a velocity of at least 600 feet per minute.

2. In ventilating a room, the method which consists in drawing air through an inlet opening, passing the air slowly through a filter without any appreciable pressure variation, and discharging the filtered air at an upward angle into the room at a relatively high velocity by means of forced draft and in small parallel jets having a combined cross-sectional area of the order of one-tenth of the section through the filtering area.

3. Ventilating apparatus comprising a box having a bottom, front and sides and a cover, means on the bottom for mounting the box on a window sill with its front substantially flush with the window sash and its rear portion disposed outside of the window sash, the cover being disposed outside of the window sash and pivoted at its rear end, and a removable filter across the box beneath the cover.

4. Ventilating apparatus comprising a box having a bottom, front and sides and a cover, means on the bottom for mounting the box on a window sill with its front substantially flush with the window sash, the cover being pivoted at its rear and having its front edge normally beneath the window sash, and a filter mounted across the box beneath the cover and removable when the cover is lifted.

5. Ventilating apparatus comprising a box having a bottom, front and sides and a cover, a filter across the rear of the box, means on the bottom for mounting the box on a window sill with its front substantially flush with the window sash and its rear portion disposed outside the window sash, the cover being disposed outside of the window sash and pivotally mounted at its rear, and means on the cover holding the filter in place when the cover is lowered.

6. Ventilating apparatus comprising a box having a bottom, front and sides and a cover, means on the bottom for mounting the box on a window sill with its front substantially flush with the window sash, a pivotal mounting for the rear of the cover, the bottom having a socket across its rear adapted to receive the bottom of a filter, and a filter mounted in said socket and extending across the rear of the box, the cover being provided with a socket fitting over the top of the filter when the cover is lowered.

7. Ventilating apparatus comprising a box having a bottom, front and sides and a cover, means on the bottom for mounting the box on a window sill with its front substantially flush with the window sash, a pivotal mounting for the rear of the cover, the bottom having a socket across its rear adapted to receive the bottom of a filter, and a filter mounted in said socket and extending across the rear of the box, the cover being provided with a socket fitting over the top of the filter when the cover is lowered, there being discharge openings in the front of the box and a fan in the box in position to draw air into the box through the filter and discharge it through said openings in the front of the box.

8. Apparatus for ventilating a room comprising a housing having a front, bottom and side walls, means on the bottom of said housing for mounting it in a window opening between the window sash and sill thereof with the front wall thereof substantially flush with the inner surface of the window sash, a cover providing a top wall of said housing, said cover being hinged at the back and having its front edge normally positioned beneath the window sash, a filter in the rear portion of said housing and disposed in vertically inclined position, said filter being of an area approximately as great as the cross-sectional area of the rear portion of the housing, there being an inlet opening in the rear of the housing and discharge openings in the front thereof, and a fan in advance of said filter for drawing air into the housing through said filter and discharging it through said openings in the front wall thereof.

9. Ventilating apparatus comprising a box having a bottom, front and sides and a cover, means on the bottom for mounting the box on a window sill with its front substantially flush with the window sash and its rear portion disposed outside of the window sash, the cover being disposed outside of the window sash and movably mounted at its rear end, and a removable filter across the box beneath the cover.

10. Ventilating apparatus comprising a box having a bottom, front and sides and a cover, means on the bottom for mounting the box on a window sill with its front substantially flush with the window sash, the cover being movably mounted at its rear and having its front edge normally beneath the window sash, and a filter mounted across the box beneath the cover and removable when the cover is moved away from the filter.

EDWIN F. CHITTENDEN.